United States Patent [19]  [11]  4,271,660
Kloefkorn et al.  [45]  Jun. 9, 1981

[54] COMBINE CONVEYOR APPARATUS

[76] Inventors: Melvin L. Kloefkorn, Manchester, Okla. 73758; Earl W. Kloefkorn, deceased, late of Manchester, Okla.; by Marvin V. Green, administrator, 3211 Uvalda St., Aurora, Colo. 80011

[21] Appl. No.: 79,792

[22] Filed: Sep. 28, 1979

[51] Int. Cl.³ .................... A01D 57/00; A01D 89/00
[52] U.S. Cl. .................................... 56/14.6; 56/14.5; 198/515
[58] Field of Search ................... 56/14.5, 124, 14.6, 56/14.4; 198/518, 515, 516, 512

[56]  References Cited
U.S. PATENT DOCUMENTS

| | | | |
|---|---|---|---|
| 2,612,980 | 10/1952 | Oehler | 198/518 |
| 2,644,284 | 7/1953 | Oberholtz et al. | 56/14.6 |
| 2,711,244 | 6/1955 | Hyman | 198/518 |
| 2,748,921 | 6/1956 | White | 198/518 |
| 3,333,405 | 8/1967 | Bulin | 56/14.6 |
| 3,525,167 | 8/1970 | Frence et al. | 37/8 |
| 3,543,487 | 12/1970 | Bodine | 56/14.6 |
| 4,170,235 | 10/1979 | Ashton et al. | 56/14.6 |

Primary Examiner—Paul J. Hirsch
Attorney, Agent, or Firm—Phillip A. Rein

[57] ABSTRACT

This is a combine conveyor apparatus having a combine auger conveyor apparatus of this invention mounted on a conventional combine structure. The combine auger conveyor apparatus includes a feeder auger conveyor assembly which transfers cut wheat or the like to a feeder slat conveyor assembly which, in turn, conveys the cut material into a threshing cylinder assembly. The feeder auger conveyor assembly is known in the prior art having spiral flights on a cylindrical support driven to move the material to the center thereof and having a central auger retractable finger assembly to move the material into the feeder slat conveyor assembly. The feeder slat conveyor assembly includes a first sprocket assembly connected by a feeder chain and slat assembly to a second sprocket assembly. Each of the first and second sprocket assemblies is provided with retractable finger assemblies to (1) pick up the cut material from the feeder auger conveyor assembly; (2) convey the material upwardly; and (3) thrust the cut material into the threshing cylinder assembly.

9 Claims, 3 Drawing Figures

COMBINE CONVEYOR APPARATUS

PRIOR ART

A search of the prior art revealed the following pertinent U.S. Pat. Nos.: 2,895,590; 2,608,283; 2,851,144; 3,525,167; 2,755,912; 2,612,980; 2,849,103.

The prior art teaches the use of an auger conveyor to move cut material centrally, then using retractable finger members to move the material on to a vertical conveyor structure.

However, none of the prior art references teaches the use of retractable finger members at each end of the vertical conveyor structure to first pick up the cut material and then thrust same into the threshing cylinder assembly.

PREFERRED EMBODIMENT OF THE INVENTION

This preferred embodiment is a combine conveyor apparatus utilizing a substantially conventional combine structure having the new and novel combine auger conveyor apparatus of this invention connected thereto. The combine auger conveyor apparatus includes (1) a feeder auger conveyor assembly; (2) an upwardly inclined feeder slat conveyor assembly to receive cut material from the feeder auger conveyor assembly; and (3) a threshing cylinder assembly to receive and thresh the cut material. The feeder auger conveyor assembly receives the cut material and moves same centrally where an auger retractable finger assembly pushes the cut material into the feeder slat conveyor assembly. The feeder slat conveyor assembly includes a first sprocket assembly, interconncted by a feeder chain and slat assembly to a second sprocket assembly. The first and second sprocket assemblies are substantially identical, each having a central shaft and retractable finger assemblies to aid in moving the cut material upwardly into the threashing cylinder assembly. The feeder chain and slat assembly also aids in moving the cut material upwardly into the threshing cylinder assembly.

OBJECTS OF THE INVENTION

One object of this invention is to provide a combine auger conveyor apparatus that moves cut material to a central point, thrusts the material into an upwardly inclined feeder slat conveyor assembly, and finally thrusts the cut material into a threshing cylinder assembly.

Another object of this invention is to provide a combine auger conveyor apparatus having a retractable finger assembly adjacent the threshing cylinder assembly operable to thrust the cut material therein.

Still another object of this invention is to provide a combine auger conveyor apparatus having an upwardly inclined feeder slat conveyor assembly having a retractable finger assembly adjacent the discharge end to aid in pushing and removing the cut material therefrom.

One other object of this invention is to provide a combine auger conveyor apparatus that is easy to use, efficient in operation, and economical to manufacture.

Various other objects, advantages, and features of the invention will become apparent to those skilled in the art from the following discussion, taken in conjunction with the accompanying drawings, in which:

FIGURES OF THE INVENTION

Figure 1:
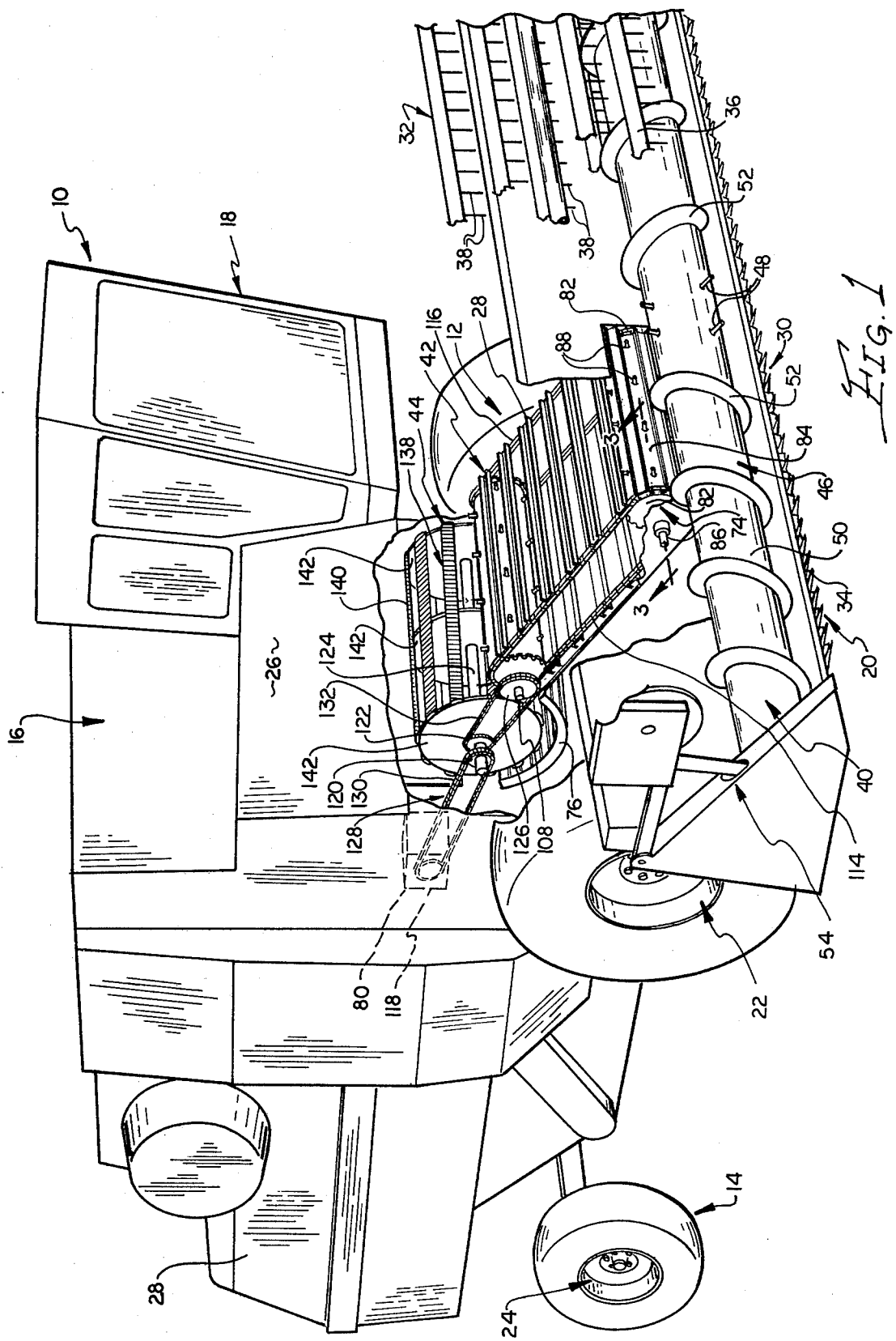
FIG. 1 is a perspective view of a combine conveyor apparatus having portions broken away to reveal the combine auger conveyor apparatus of this invention.

The following is a discussion and description of preferred specific embodiments of the combine conveyor apparatus of this invention, such being made with reference to the drawings, whereupon the same reference numerals are used to indicate the same or similar parts and/or structure. It is to be understood that such discussion and description is not to unduly limit the scope of the invention.

SPECIFICATION OF THE INVENTION

As shown in FIG. 1, a substantially conventional combine conveyor apparatus 10 is shown with a combine auger conveyor apparatus of this invention, indicated generally at 12, connected thereto. The combine conveyor apparatus 10 includes (1) a support base 14; (2) a main combine housing 16 mounted on the support base 14; (3) an operator cab housing 18 connected to the main combine housing 16; and (4) a material directing and cutting apparatus 20 projected forwardly of the entire described structures.

The support base 14 includes front support wheel assemblies 22 and back support wheel assemblies 24 to support the main combine housing 16 thereon.

The main combine housing 16 includes a grain and straw separator housing 26 connected to a material container housing 28 in a conventional manner.

The operator cab housing 18 has the conventional operator's chair, controls, etc.

The material directing and cutting apparatus 20 is conventional and used to cut wheat and the like. The material directing and cutting apparatus 20 includes a reciprocating sickle assembly 30 and a rotatable crop directing reel 32. The reciprocating sickle assembly 30 includes a plurality of cooperating cutting knives 34 to sever the wheat material near the ground surface.

The rotatable crop directing reel 32 includes a plurality of elongated support bars 36 in a circle about a support ring (not shown) and each support bar 36 includes a plurality of downwardly depending, spaced spike members 38. The spike members 38 operate in a conventional manner to direct the wheat material in an upright manner into the cutting knives 34.

The combine auger conveyor apparatus includes (1) a feeder auger conveyor assembly 40; (2) a feeder slat conveyor assembly 42 operably associated with the feeder auger conveyor assembly 40; and (3) a threshing cylinder assembly 44 operably associated with the feeder slat conveyor assembly 42.

The feeder auger conveyor assembly 40 includes an auger assembly 46 having an auger retractable finger assembly 48 connected thereto and is known in the prior art as shown by the U.S. Pat. No. 2,849,103.

The auger assembly 46 includes a cylindrical support drum 50; spiral or screw flights 52 mounted about the support drum 50; and a drive means 54 to rotate the support drum 50. The support drum 50 rotates to convey the cut wheat material centrally in a conventional manner to the auger retractable finger assembly 48.

The auger retractable finger assembly 48 operates similar to that shown in the U.S. Pat. No. 2,849,103 and includes a finger assembly 56 connected to a main support shaft 58. The finger assembly 56 includes four retractable finger members 60 extended at outer ends through holes 62 in the cylindrical support drum 50 and inner ends are connected by finger mount members 64 to an eccentric crank shaft section 66 of the main support shaft 58 (similar to FIG. 3) to move in and out as shown by an arrow 68 (FIG. 2) on rotation of the cylindrical support drum 50 while the main support shaft 58 does not rotate.

The finger mount members 64 include bearing members 70 to permit the retractable or in-out movement of the retractable finger members 60 on rotation of the cylindrical support drum 50.

The drive means 54 rotates the cylindrical support drum 50 in a counter-clockwise direction as indicated by an arrow 72 in a conventional manner.

Figure 2:
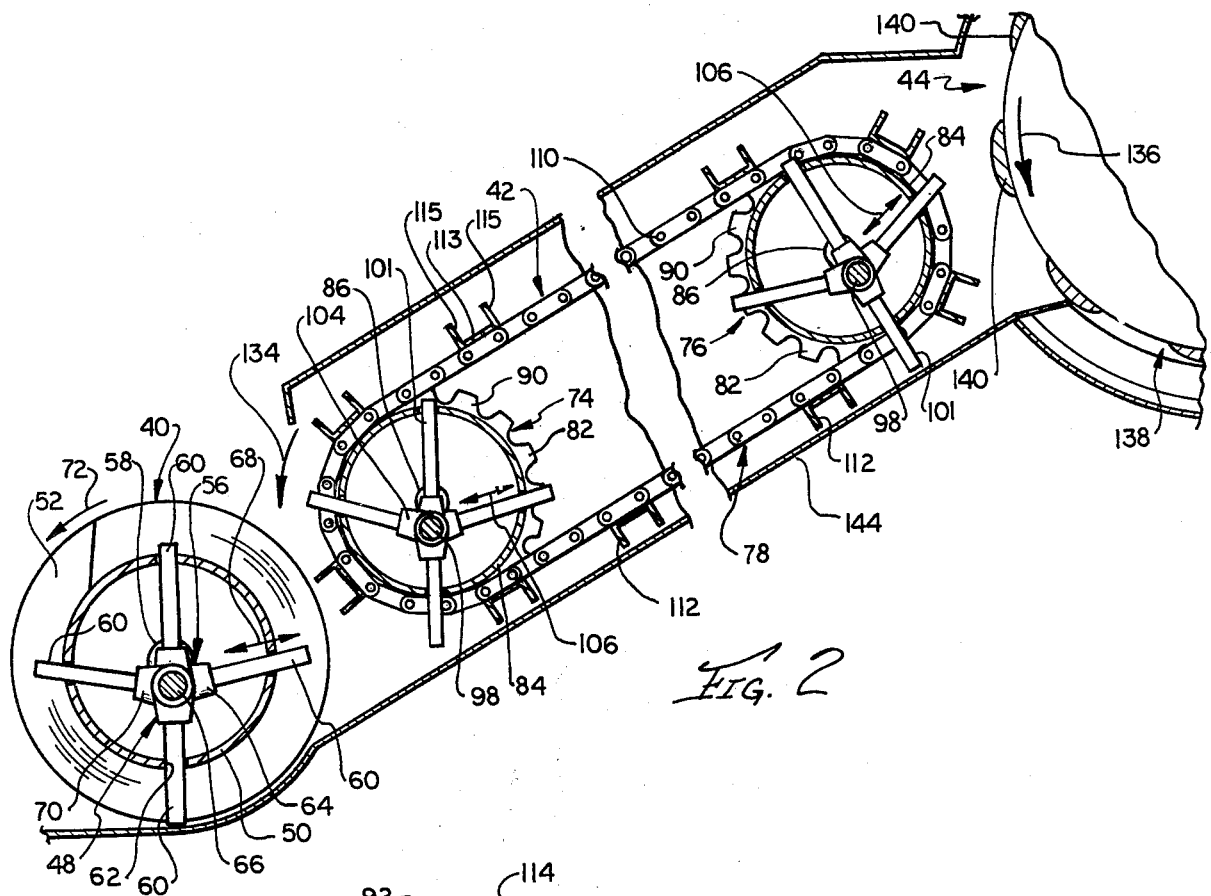
FIG. 2 is an enlarged fragmentary sectional view taken along line 2—2 in FIG. 1.

As noted in FIGS. 1 and 2, the feeder slat conveyor assembly 42 includes (1) a first sprocket assembly 74; (2) a second sprocket assembly 76; (3) a feeder chain and slat assembly 78 interconnecting the first and second sprocket assemblies 74, 76; and (4) a drive motor and sprocket assembly 80 connected to the second sprocket assembly 76.

The first sprocket assembly 74 includes a pair of spaced sprocket members 82 interconnected by a connector drum member 84; a main support shaft member 86 extended the length of the connector drum member 84 and extended outwardly of each sprocket member 82; and a plurality, namely four, retractable finger assemblies 88 connected to the main support shaft member 86. The sprocket members 84 are of a conventional type having outer teeth members 90 to receive a chain member as will be described and a plurality of sprocket members 82 may be used, such 3, 4, or more.

Each outer end of the main support shaft 86 extends through a support wall 92 and is secured thereto by a connector block 94 and does not rotate. The connector drum member 84 is rotatably mounted in a bearing member 95 secured to the sprocket member 82.

Figure 3:
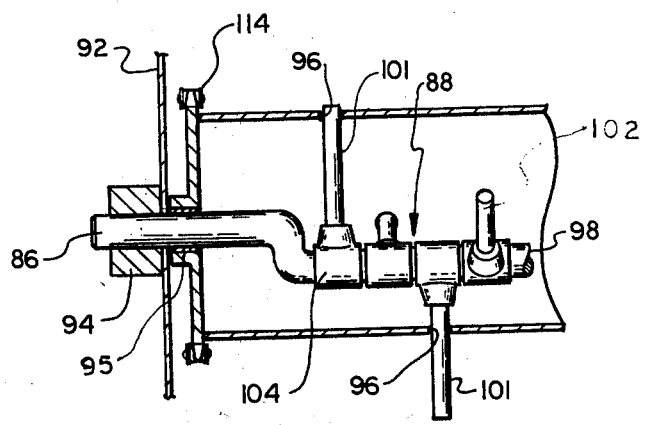
FIG. 3 is an enlarged fragmentary sectional view taken along line 2—2 in FIG. 1.

The connector drum member 84 is provided with four sets of spaced finger holes 96 identical to the set shown in FIG. 3.

Each retractable finger assembly 88 is identical so only one need be described in detail. (FIGS. 2 and 3). The retractable finger assembly 88 includes an eccentric shaft portion 98 formed as an integral part but offset from the main support shaft 86 and a finger member assembly 101 conncted to the eccentric shaft portion 98.

The finger member assembly 101 includes four finger members 102 pivotally connected by finger mount sections 104 to the eccentric shaft portion 98. The finger members 102 resemble elongated shaft members and move in and out of the respective finger holes 96 on rotation of the connector drum member 84 as will be explained and shown by an arrow 106 in FIG. 2.

The second sprocket assembly 76 is substantially identical to the first sprocket assembly 74 except having a drum drive shaft 108 extended outwardly to receive the drive motor and sprocket assembly 80 thereon. Rotation of the drum drive shaft 108 rotates the connector drum member 84.

The feeder chain and slat assembly 78 includes a spaced chain assembly 110 interconnected by parallel elongated, feeder conveyor slat members 112 which can be of any size and shape. The chain assembly 110 includes a conventional first chain member 114 and a second chain member 116 mounted about the spaced sprocket members 82.

Each conveyor slat member 112 is of a U-shape in transverse cross section having a main body section 113 with integral spaced, parallel sidewall members 115.

As shown in FIG. 1, the drive motor and sprocket assembly 80 inclues (1) a drive motor 118; (2) a driven gear 120 and a transmitter gear 122 mounted on a main support shaft 124 of the threshing cylinder assembly 44; (3) a conveyor driven gear 126 connected to the drum drive shaft 108 of the second sprocket assembly 76; and (4) a chain assembly 128 connected to the abovementioned gears.

More particularly, the chain assembly 128 includes (1) a drive chain 130 to interconnect the drive motor 118 to the driven gear 120; and (2) an intermediate chain 132 to interconnect the transmitter gear 122 to the conveyor driven gear 126.

It is obvious that operation of the drive motor and sprocket assembly 80 will rotate the feeder slat conveyor assembly 42 and the threshing cylinder assembly 44 as shown by the arrows 134, 136 in FIG. 2.

As shown in FIG. 1, the threshing cylinder assembly 44 is of a conventional type having a main support assembly 138 with a plurality of elongated threshing bar members 140 connected thereto. The main support assembly 138 includes the main support shaft 124 having three (3) spaced vertically extended, support disc members 142 with the threshing bar members 140 interconnected therebetween.

USE AND OPERATION OF THE INVENTION

This invention relates to the combine auger conveyor apparatus 12 with the feeder auger conveyor assembly 40 first receiving the cut material or wheat from the material directing and cutting apparatus 20. The feeder auger conveyor assembly 40 moves the cut material centrally to the auger retractable finger assembly 48. As noted in FIG. 2, the retractable fingers 60 throw the cut material into the feeder slat conveyor assembly 42.

The cut material is then picked up by the retractable finger assemblies 88 of the first sprocket assembly 74 and the feeder conveyor slat members 112 and moved upwardly as supported on support wall 144.

Next the retractable finger assemblies 88 of the second sprocket assembly 76 is very important to (1) thrust the cut material into the threshing cylinder assembly 44; and (2) clean the cut material caught between the feeder conveyor slat members 112. This is a very important feature of this invention to achieve positive movement of the cut material into the threshing bar members 140 of the threshing cylinder assembly 44.

The teeth 90 of the sprocket members 82, the finger holes 96 in the connector drum member 84, and the spacing of the conveyor slat members 112 on the chain assembly 110, must be coordinated for proper operation thereof.

For example, the teeth members 90 on the sprocket members 82 must be in multiples of four, such as 16, 20, 24, etc., in combination of the conveyor slat members 112 being spaced every four (4) links, or multiples of four, of the chain assembly 110 and the number of links of the chain assembly 110 being in multiples of four.

Also, the finger holes 96 in the connector drum member 84 must be spaced apart from each other 90 degrees.

The combine auger conveyor apparatus of this invention is sturdy in construction, easy to use, and efficient in operation.

While the invention has been described in conjunction with preferred specific embodiments thereof, it will be understood that this description is intended to illustrate and not to limit the scope of the invention, which is defined by the following claims.

It is claimed:

1. A combine conveyor apparatus having a new and novel combine auger conveyor apparatus contained therein, comprising:
   (a) said combine conveyor apparatus includes a combine material directing and cutting apparatus to cut material and move same into said combine auger coveyor apparatus;
   (b) said combine auger conveyor apparatus includes (1) a feeder auger conveyor assembly to receive the material from the combine material directing and cutting apparatus; (2) a feeder slat conveyor assembly to receive the material from the feeder auger conveyor assembly; and (3) a threshing cylinder assembly to receive the material from the feeder slat conveyor assembly;
   (c) said feeder slat conveyor assembly includes a first sprocket assembly with a retractable finger assembly adjacent said threshing cylinder assembly to thrust material thereto;
   (d) said feeder slat conveyor includes a second sprocket assembly connected to said first sprocket assembly by a feeder chain and slat assembly; (e) said feeder chain and slat assembly includes a spaced chain assembly to interconnect said first sprocket assembly and said second sprocket assembly and a plurality of parallel, feeder conveyor slat members interconnecting said chain assembly; and
   (f) said feeder conveyor slat members act against the material to move same upwardly to said second sprocket assembly.

2. A combine conveyor apparatus as described in claim 1, wherein:
   (a) said feeder conveyor slat members are U-shape in transverse cross section; and
   (b) said retractable finger assembly of said first sprocket assembly having a plurality of finger members movable between said slat members to clean the material therefrom and thrust the material into said threshing cylinder assembly.

3. A combine conveyor apparatus as described in claim 1, wherein:
   (a) said second sprocket assembly has a retractable finger assembly to thrust material upwardly into said feeder chain and slat assembly.

4. A combine conveyor apparatus as described in claim 3, wherein:
   (a) each of said retractable finger assemblies on said first sprocket assembly and said second sprocket assembly having a plurality of spaced finger member assemblies thereon.

5. A combine conveyor apparatus as described in claim 4, wherein:
   (a) each of said spaced finger member assemblies having four reciprocating finger members to contact and move the material.

6. A combine conveyor apparatus as described in claim 4, wherein:
   (a) said first sprocket assembly and said second sprocket assembly having four of said spaced finger member assemblies mounted thereon.

7. A combine conveyor apparatus as described in claim 1, wherein:
   (a) said feeder auger conveyor assembly includes an auger assembly having an auger retractable finger assembly mounted centrally of said auger assembly;
   (b) said auger assembly has spiral flights to move material inwardly to said auger retractable finger assembly.

8. A combine conveyor apparatus as described in claim 7, wherein:
   (a) said feeder auger conveyor assembly having a pair of adjacent auger retractable finger assemblies to move material into said feeder slat conveyor assembly.

9. A combine conveyor apparatus as described in claim 8, wherein:
   (a) said auger retractable finger assemblies having retractable finger members fully extended in the vertical position.

* * * * *